United States Patent [19]

Nakanishi et al.

[11] 3,887,543

[45] June 3, 1975

[54] THIENO(2,3-E)(1,4)DIAZEPINE DERIVATIVES

[75] Inventors: Michio Nakanishi, Oita; Masami Shiroki; Tetsuya Tahara, both of Fukuoka; Kazuhiko Araki, Fukuoka, all of Japan

[73] Assignee: Yoshitomi Pharmaceutical Industries, Ltd., Osaka, Japan

[22] Filed: Jan. 29, 1974

[21] Appl. No.: 437,590

Related U.S. Application Data

[63] Continuation-in-part of Ser. No. 205,765, Dec. 7, 1971, abandoned.

[30] Foreign Application Priority Data

Dec. 7, 1970   Japan.............................. 45-108818
Dec. 19, 1970   Japan.............................. 45-114680

[52] U.S. Cl............ 260/239.3 B; 424/275; 424/244
[51] Int. Cl........................................... C07d 99/06
[58] Field of Search ............................ 260/239.3 B

[56] References Cited
UNITED STATES PATENTS 3,669,959   6/1972   Hromatka et al. ........... 260/239.3 B

*Primary Examiner*—Henry R. Jiles
*Assistant Examiner*—Robert T. Bond
*Attorney, Agent, or Firm*—Sughrue, Rothwell, Mion, Zinn and Macpeak

[57] ABSTRACT

A thieno [2,3-e][1,4] diazepine compound of the formula:

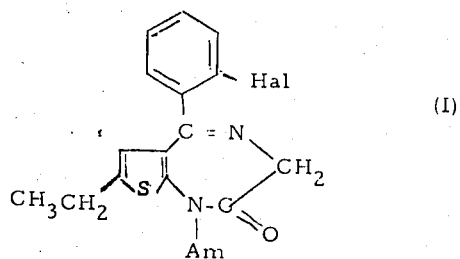

wherein Hal is a halogen atom, and Am is an $-NH_2$ or $-CONHCH_3$ group; and a pharmaceutically acceptable salt thereof. Hal is selected from the group consisting of F, Cl, Br and I.

The compounds encompassed within the formula presented above exhibit pharmacologic activities in the form of narcosis potentiation, suppression of fighting behavior, an anti-convulsant activity, which activities permit such compounds to be employed in the treatment of anxiety neuroses, hypochrondriasis, hysteria, depression states, psychosomatic illnesses, and epilepsy.

3 Claims, No Drawings

THIENO(2,3-E)(1,4)DIAZEPINE DERIVATIVES

RELATION TO OTHER PATENT APPLICATIONS

This application is a continuation-in-part of Ser. No. 205,765 filed Dec. 7, 1971 now abandoned. Priority is claimed based on the Japanese priority documents submitted during the prosecution of Ser. No. 205,765.

BACKGROUND OF THE INVENTION

1. Field of the Invention

The present invention relates to therapeutically valuable thieno [2,3-e][1,4] diazepine derivatives.

2. Description of the Prior Art

Compounds of the formula

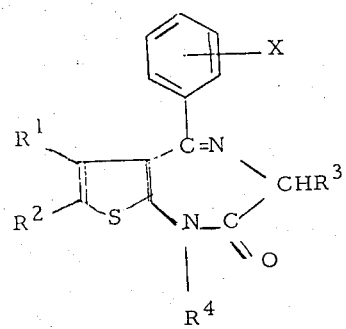

$R^1$, $R^2$ = H, lower alkyl, aryl, $CF_3$, halogen, nitro, lower alkoxy, etc. or $R^1$ and $R^2$ combinedly form $-(CH_2)_n-$, $n$ = 3, 4, 5;

$R^3$ = H, lower alkyl;

$R^4$ = H, lower alkyl, lower cycloalkyl; and

X = H, halogen, $CF_3$, lower alkoxy, are disclosed in Netherlands patent application No. 6,918,458, German patent application No. 2,005,276 and U.S. patent application Ser. No. 116,240 (copending) as having utility as muscle relaxants, tranquilizers activity, CNS-depressants, anticonvulsants and minor tranquilizers.

SUMMARY OF THE INVENTION

A thieno[2,3-e][1,4] diazepine compound of the formula:

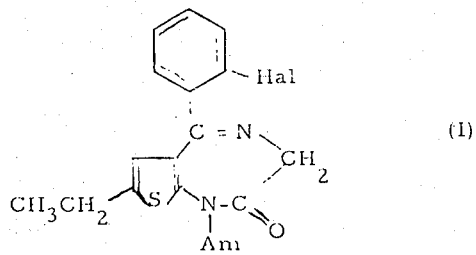

wherein Hal is a halogen atom, and Am is an $-NH_2$ or $-CONHCH_3$ group; and a pharmaceutically acceptable salt thereof. Hal is selected from the group consisting of F, Cl Br and I.

The compounds encompassed within the formula presented above exhibit pharmacologic activities in the form of narcosis potentiation, supression of fighting behaviour, an anti-convulsant activity, which activities permit such compounds to be employed in the treatment of anxiety neuroses, hypochrondriasis, hysteria, depression states, psychosomatic illnesses, and epilepsy.

DETAILED DESCRIPTION OF THE INVENTION

Compounds of general formula (I) can be produced by one of the following methods (i) and (ii):

i. In the case of compounds of the general formula (I) wherein Am is $-NH_2$, by reacting a compound of the formula

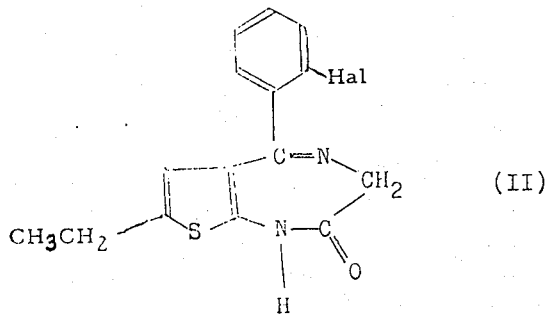

with an aminating agent.

The aminating agent is, for example, a hydroxylamine derivative such as O-2,4-dinitrophenylhydroxylamine, O-mesitoylhydroxylamine or hydroxylamine-O-sulfonic acid, or a halogenated amine such as chloroamine or bromoamine.

The reaction is usually carried out in a solvent by first converting, in a solvent at a temperature of from room temperature to reflux temperature, compound (II) into an alkali metal salt with a metallating agent, such as an alkali metal (Li, Na or K) or an alkali metal compound (hydride, alkoxide or amide of an alkali metal), and then reacting the alkali metal salt with an aminating agent at a temperature of from room temperature to reflux temperature. The solvent can be, for example, benzene, toluene, xylene, chloroform, dichloromethane, tetrahydrofuran, ethyl ether, isopropyl ether, dioxane or dimethylformamide. The time for reaction (i) and (ii) is usually about 1 to 50 hours. The pressure is generally:

reaction (i): atmospheric pressure reaction (ii): at atmospheric pressure, or at a pressure of up to about 30kg/cm$^2$ (in a pressure vessel such as an autoclave or a pressure bottle), at a temperature of from about 80° to about 100°C.

ii. In the case of compounds of general formula (I) wherein Am is $-CONHCH_3$, by reacting a compound of formula (II) with a compound of the formula:

$$CH_3 - NCO$$

(III)

The reaction is usually carried out in a solvent, preferably in an aromatic hydrocarbon such as benzene, toluene or xylene, at a temperature of from room temperature to reflux temperature.

Starting compounds of general formula (II) can be produced by the methods disclosed in Belgian Pat. No. 763,014, for example, by subjecting a compound of the formula

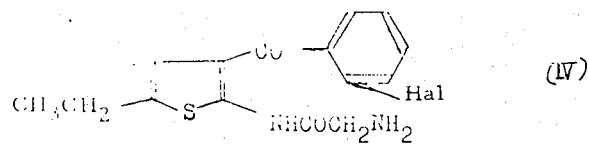

or a salt thereof to intramolecular condensation.

The compounds of formula (I) can be converted into the corresponding acid addition salts in a conventional manner by treatment with various inorganic and organic acids, for example, hydrochloric, hydrobromic, nitric, sulfuric, citric, maleic, fumaric, succinic, oxalic and tartaric acid.

The compounds of formula (I) and the pharmaceutically acceptable acid addition salts thereof have excellent pharmacological actions in narcosis potentiation, suppression of fighting behavior and anticonvulsant effects as shown, for example, by the following tests.

I. Narcosis Potentiation

The influence of 30 minutes pre-treatment with the test compound on the action of 40 mg/kg (sub-narcotic dose) of hexobarbital was investigated using groups of 6 male mice. The effect of narcosis potentiation by the test compound was determined by the disappearance of the righting reflex lasting for more than 30 seconds. The righting reflex was examined at 15 and 30 minutes after the administration of hexobarbital. When no reflex was observed at either time, the rate of narcosis potentiation was evaluated as 100%, and the $PD_{50}$ (50% potentiation dose) of the test compound was determined graphically. The test compounds were all administered intraperitoneally. (Time O — test compound intraperitoneally administered; Time 30 minutes — 40 mg/Kg of mouse weight of hexobarbital intraperitoneally administered. Time 45 minutes and Time 60 minutes: righting reflex tested.)

II. Suppression of Fighting Behavior

Fighting episodes were produced in mice by the method described by Tedeschi et al. in the Journal of Pharmacology and Experimental Therapeutics, vol. 125, p. 28 ff. (1959). Groups of 8 female mice (4 pairs) were given the test compound orally 60 minutes prior to receiving an electric foot-shock for 3 minutes with a 530 volt interrupted direct current, 1.3 milliampers 10 cycles per second. The exhibition of 3 fighting episodes or less within the 3 minute electric foot shock treatment was deemed to be a suppression of the fighting behavior by the test compound. 81 pairs of control mice had shown an 8.7 fighting episode average under the same conditions without administration of the test compound. The $ED_{50}$, the dose required to suppress 50% of fighting pairs, was determined graphically.

III. Anticonvulsant Effect

Pentylenetetrazole (150 mg/kg) was administered subcutaneously to groups consisting of 6 mice 15 minutes after the intraperitoneal administration of the test compound. The number of dead mice was counted 3 hours after the administration of pentylenetetrazole, and then the $ED_{50}$, the dose required to suppress the mortality rate to 50%, was determined graphically. Results:

| Compound | Narcosis Potentiation, $PD_{50}$ mg/kg |
|---|---|
| A | 1.25 – 2.5 |
| B | 1.25 – 2.5 |
| Compound | Suppression of Fighting Behavior, $ED_{50}$ mg/kg |
| A | 5 – 10 |
| B | 2.5 – 5.0 |
| Compound | Anticonvulsant Effect, $ED_{50}$ mg/kg |
| A | 0.63 |
| B | 0.63 – 1.25 |

Compounds A and B are identified below:
 A: 1-amino-5-o-chlorophenyl-7-ethyl-1,2-dihydro-3H-thieno[2,3-e][1,4]diazepin-2-one
 B: 1-methylcarbamoyl-5-o-chlorophenyl-7-ethyl-1,2-dihydro-3H-thieno-[2,3-e][1,4]diazepin-2-one For discussions of above tests, see F. E. Roth et al. "Archives Internationales de Pharmacodynamie et de Therapie" vol. 118, p. 375 ff. (1959); and W. L. Kuhn et al. "Journal of Pharmacology and Experimental Therapeutics" vol. 134, p. 60 ff. (1961).

In view of various tests, including those mentioned above, the compounds of the invention represented by formula (I) and pharmaceutically acceptable acid addition salts thereof can be safely administered as minor tranquilizers for the treatment of anxiety neurosis, hypochondriasis, hysteria, depressive state, psychosomatic disease, epilepsy, and the like, in the form of a pharmaceutical preparation with a suitable and conventional carrier or adjuvant, administrable orally, without harm to the patients.

The pharmaceutical preparations can take any conventional form such as tablets, capsules or powders.

FORMULATION EXAMPLE 5 mg tablets were prepared from the following compositions:

| Compound (I) | 5.0 mg |
|---|---|
| Starch | 20.0 |
| Lactose | 50.5 |
| Methyl Cellulose | 1.0 |
| Magnesium Stearate | 0.5 |
| Talc | 3.0 |
| | 80.0 mg |

1% powders were prepared from the following compositions:

| Compound (I) | 1 % |
|---|---|
| Starch | 18 |
| Lactose | 80 |
| Methyl Cellulose | 1 |
| | 100 % |

The oral daily dose of compound (I) or a salt thereof for human adults usually ranges from about 10 to 30 milligrams, in single or multiple dose.

The present invention will be better understood from the following examples which are illustrative and not limitative of the present invention.

EXAMPLE 1

To a suspension of 1.4 g of sodium hydride (about 50% in mineral oil) in 50 ml of dimethylformamide there was added carefully, with stirring, 7.3 g of 5-o-chlorophenyl-7-ethyl-1,2-dihydro-3H-thieno[2,3-e][1,4]diazepin-2-one. The resulting suspension was stirred at 70°C on a water bath for 30 minutes. After cooling, 5 g of O-2,4-dinitrophenylhydroxylamine was added at 20°–25°C. After stirring at room temperature for 2 hours, the reaction mixture was poured into ice water, and the aqueous mixture extracted with chloroform. The chloroform extract was washed well with water and dried over magnesium sulfate, and the solvent distilled off under reduced pressure. The residue was treated with a mixture of petroleum ether and ethanol (50 ml: 5 ml) and the white crystals thus obtained were recrystallized from ethanol to give 1-amino-5-o-chlorophenyl-7-ethyl-1,2-dihydro-3H-thieno[2,3-e][1,4]diazepin-2-one, melting at 153°–154°C, in 90% yield.

EXAMPLE 2

To a suspension of 6.1 g of sodium hydride (about 50% in mineral oil) in 150 ml of tetrahydrofuran there was added carefully, with stirring, 30.4 g of 5-o-chlorophenyl-7-ethyl-1,2-dihydro-3H-thieno[2,3-e][1,4]diazepin-2-one. The resulting suspension was stirred at 70°C on a water bath for 30 minutes. After cooling, there was added thereto 500 ml of diethyl ether solution containing chloroamine at a concentration of 0.25 M. After stirring at room temperature for 15 hours, the reaction mixture was poured into water and the aqueous mixture extracted with ether. The ethereal extract was washed well with water, dried over magnesium sulfate and the solvent distilled off. The residue was crystallized with a mixture of petroleum ether and ethanol, and the white crystals thus obtained recrystallized from ethanol to give 1-amino-5-o-chlorophenyl-7-ethyl-1,2-dihydro-3H-thieno[2,3-e][1,4]diazepin-2-one, melting at 153°–154°C, in 73% yield.

EXAMPLE 3

To a solution of 10 g of 5-o-chlorophenyl-7-ethyl-1,2-dihydro-3H-thieno[2,3-e][1,4]diazepin-2-one in 200 ml of benzene is added 4 g of methyl isocyanate, the resulting mixture is refluxed for 5 hours, an additional 1 g of methyl isocyanate is added, and the whole mixture refluxed for an additional 5 hours. The reaction mixture is then evaporated to dryness under reduced pressure, and the crude crystalline product recrystallized from ethanol to give 1-methylcarbamoyl-5-o-chlorophenyl-7-ethyl-1,2-dihydro-3H-thieno[2,3-e][1,4]diazepin-2-one as white crystals, melting at 126°–127°C with decomposition.

EXAMPLE 4

Compounds of the prior art have been tested using the Narcosis Potentiation, Suppression of Fighting Behavior and Anticonvulsant Effect tests described above. In the following Table, the test results of the two compounds of the invention tested above are compared with the following test compounds 3–7.

The test compounds are shown below:

A: 1-amino-5-o-chlorophenyl-7-ethyl-1,2-dihydro-3H-thieno[2,3-e][1,4]-diazepin-2-one (the compound of claim 2 of the invention)

B: 1-methylcarbamoyl-5-o-chlorophenyl-7-ethyl-1,2-dihydro-3H-thieno[2,3-e][1,4]diazepin-2-one (the compound of claim 3 of the invention)

3: 6,7,8,9-tetrahydro-5-phenyl-1H[1]benzothieno[2,3-e][1,4]diazepin-2(3H)-one (the compound of claim 2 of Tinney reference)

4: 6,7,8,9-tetrahydro-1-methyl-5-phenyl-1H-[1]benzothieno[2,3-e][1,4]diazepin-2(3H)-one (the compound of claim 5 of Tinney reference)

5: 5-o-chlorophenyl-6,7,8,9-tetrahydro-1H-[1]benzothieno[2,3-e][1,4]diazepin-2-(3H)-one (the compound of Example 5 of Tinney reference)

6: 7-chloro-1,3-dihydro-5-phenyl-2H-thieno[2,3-e]-1,4-diazepin-2-one (the compound of claim 7 of Hromatka reference)

7: 7-chloro-1,3-dihydro-1-methyl-5-phenyl-2H-thieno[2,3-e]-1,4-diazepin-2-one (the compound of claim 13 of Hromatka reference)

The results are summarized in the following Table:

| Test Compound | Narcosis Potentiation $PD_{50}$ mg/kg | Suppression of Fighting Behavior $ED_{50}$ mg/kg | Anticonvulsant Effect $ED_{50}$ mg |
|---|---|---|---|
| A | 1.25–2.5 | 5–10 | 0.63 |
| B | 1.25–2.5 | 2.5–5.0 | 0.63–1.25 |
| 3 | >40 | 20 | 35 |
| 4 | 15 | 35 | 15 |
| 5 | 20 | 10 | 20 |
| 6 | 10 | 20–40 | 30 |
| 7 | 5–10 | 20–40 | 10–20 |

The Tinney reference is U.S. Pat. No. 3,558,606, and the Hromatka reference is U.S. Pat. No. 3,669,959.

EXAMPLE 5

Comparative pharmacological testing between the 1-amino and 1-methylcarbamoyl derivatives of the present invention and the corresponding 1-hydro derivative have been carried out as follows:

| Compound | A | B | C |
|---|---|---|---|
| Narcosis Potentiation $PD_{50}$ mg/kg | 1.25–2.5 | 1.25–2.5 | 1.25–2.5 |
| Suppression of Fighting Behavior $ED_{50}$ mg/kg | 5–10 | 2.5–5.0 | 5 |
| Anticonvulsant Effect $ED_{50}$ mg/kg | 0.63 | 0.63–1.25 | 3.3 |
| Reserpine Potentiation $PD_{30}$ mg/kg | 80 | | no effect |
| Reserpine Antagonism $RD_{30}$ mg/kg | | 80 | no effect |

Compound:

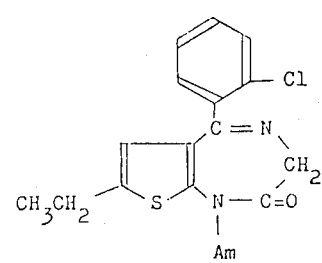

A: 1-amino-5-o-chlorophenyl-7-ethyl-1,2-dihydro-3H-thieno[2,3-e][1,4]diazepin-2-one (the compound of the present invention where Am = NH$_2$)
B: 1-methylcarbamoyl-5-o-chlorophenyl-7-ethyl-1,2-dihydro-3H-thieno[2,3-e][1,4]-diazepin-2-one (the compound of the present invention where Am = —CONHCH$_3$)
C: 5-o-chlorophenyl-7-ethyl-1,2-dihydro-3H-thieno[2,3-e][1,4]-diazepin-2-one (Am = H, the 1-hydro derivative)

Methods:
1. The methods of testing narcosis potentiation, suppression of fighting behavior and anticonvulsant effect are as described in the present specification hereinabove.
2. The method of testing for reserpine potentiation or antagonism is based on effect of the compound on reserpine-induced ptosis is as follows:

Groups of 4 female mice each were used. According to the following criteria, the degree of palpebral ptosis of both eyes were scored at 15, 60, 120 and 180 minutes after intraperitoneal administration of reserpine (10 mg/kg):

| Palpebra | Score (for each eye) |
|---|---|
| Closed perfectly (ptotic state) | 4 |
| Between half closed and ptotic state | 3 |
| Half closed | 2 |
| Between non-ptotic state and half closed | 1 |
| Normal (non-ptotic state) | 0 |

The following scores, which were obtained as average values (±S.D.) with 30 control groups of 4 mice treated with reserpine in past experiments were used as control values (Maximum effect for each group is 32 calculated as a score of "4" times 8 eyes).

| | |
|---|---|
| 15 minutes later | 0.33 ± 0.75 |
| 60 minutes later | 26.90 ± 2.14 |
| 120 minutes later | 31.67 ± 0.17 |
| 180 minutes later | 32.00 ± 0 |

The test compound was administered subcutaneously to the animals 30 minutes prior to the administration of reserpine. The degree of ptosis was expressed as the measured score less the corresponding reference score at the time of measurement. Accordingly, the antagonized case was given a minus score. The dose amount which caused the total of scores with 4 animals, at 60, 120 and 180 minutes, smaller than −27 (ca. 30% antagonism) was expressed as RD$_{30}$. The dose amount which caused the total of scores with 4 animals at 15 minutes at 10 (ca. 30% potentiation) was expressed as PD$_{30}$.

As is seen from the data cited above, compounds A and B of the present invention exhibit more potent anticonvulsant effect (2.6–5.2 times) than compound C. Moreover, compound A exhibits reserpine potentiation while compound B exhibits reserpine antagonism. The latter fact suggests that the compound A can also be used effectively as a neuroleptic for the treatment of schizophrenia or mania, while compound B can have use as an antidepressant for the treatment of depressant states. As tabulated, the 1-hydro derivative did not exhibit any significant reserpine potentiation or reserpine antagonistic effect up to a dosage level of 160 mg/Kg.

Although the present invention has been adequately discussed in the foregoing specification and examples included therein, one readily recognizes that various changes and modifications may be made without departing from the spirit and scope thereof.

What is claimed is:
1. A thieno[2,3-3][1,4]diazepine compound of the formula:

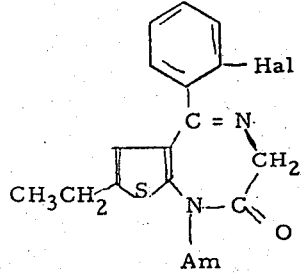

wherein Hal is a halogen atom, and Am is an —NH$_2$ or —CONHCH$_3$ group; and a pharmaceutically acceptable acid addition salt thereof.

2. The compound of claim 1:
1-amino-5-o-chlorophenyl-7-ethyl-1,2-dihydro-3H-thieno[2,3-e][1,4]diazepine-2-one.

3. The compound of claim 1:
1-methylcarbamoyl-5-o-chlorophenyl-7-ethyl-1,2-dihydro-3H-thieno[2,3-e][1,4]diazepine-2-one.

* * * * *